(12) United States Patent
Shitrit et al.

(10) Patent No.: US 8,696,270 B2
(45) Date of Patent: Apr. 15, 2014

(54) CUTTING TOOL AND COUPLING MECHANISM THEREFOR

(75) Inventors: Shim'on Shitrit, Kibbutz Metzuba (IL); Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 316 days.

(21) Appl. No.: 13/341,700

(22) Filed: Dec. 30, 2011

(65) Prior Publication Data

US 2012/0099938 A1     Apr. 26, 2012

(30) Foreign Application Priority Data

Jan. 26, 2011   (IL) .......................................... 210893

(51) Int. Cl.
  *B23B 31/113*   (2006.01)
(52) U.S. Cl.
  USPC .......... 408/231; 408/226; 408/239 R; 279/93; 403/348
(58) Field of Classification Search
  CPC ................... B23B 2231/0204; B23B 2231/04; B23B 2240/04; B23B 2240/32; B23B 2251/02
  USPC .............. 403/348, 350; 279/93, 94, 102, 103; 408/238, 239 R, 239 A, 231, 232, 226
  See application file for complete search history.

(56) References Cited

U.S. PATENT DOCUMENTS

| | | | | |
|---|---|---|---|---|
| 1,975,877 A * | 10/1934 | Thomas | ........................... | 279/93 |
| 2,057,143 A * | 10/1936 | Gairing | ........................... | 279/93 |
| 2,092,060 A * | 9/1937 | Gairing | ........................... | 279/93 |
| 2,103,379 A | 12/1937 | Oxford | | |
| 2,158,120 A * | 5/1939 | Hirschberg | ................... | 175/417 |
| 2,219,907 A * | 10/1940 | Ross | .............................. | 279/93 |
| 3,747,946 A | 7/1973 | Edens | | |
| 4,361,196 A * | 11/1982 | Hoyle, Jr. | ...................... | 175/320 |
| 5,971,673 A | 10/1999 | Berglund et al. | | |
| 6,000,888 A * | 12/1999 | Hartman | .................. | 408/239 R |
| 6,276,879 B1 * | 8/2001 | Hecht | ........................... | 409/234 |
| 7,112,021 B2 * | 9/2006 | Pantzar | ........................ | 409/234 |
| 7,175,379 B2 * | 2/2007 | Sellhorn et al. | ............... | 414/607 |
| 8,511,948 B2 * | 8/2013 | Guy | ........................... | 408/239 R |
| 2006/0127194 A1 * | 6/2006 | Schafer | ........................ | 408/231 |
| 2009/0116920 A1 | 5/2009 | Bae | | |

FOREIGN PATENT DOCUMENTS

| | | |
|---|---|---|
| CA | 2259018 A1 | 7/2000 |
| DE | 3913626 A * | 10/1990 |
| DE | 20 2006 014812 U1 | 12/2006 |
| GB | 558868 A | 1/1944 |
| GB | 2123523 A | 2/1984 |

OTHER PUBLICATIONS

International Search Report dated Mar. 7, 2012 issued in PCT counterpart application No. PCT/IL2011/000932.
Written Opinion dated Mar. 7, 2012 issued in PCT counterpart application No. PCT/IL2011/000932.

* cited by examiner

*Primary Examiner* — Daniel Howell
*Assistant Examiner* — Nicole N Ramos
(74) *Attorney, Agent, or Firm* — Womble Carlyle

(57) ABSTRACT

A cutting tool having a cutting head removably secured to a shank by frictional forces maintained between a male coupling member located in a female coupling member. Support surfaces of the male coupling member engage support walls of the female coupling member. The support surfaces lie on a common cylinder having a larger diameter than a common cylinder on which the support walls lie. The support walls are located on a circumferentially continuous bore wall of the female coupling member.

20 Claims, 4 Drawing Sheets

US 8,696,270 B2

CUTTING TOOL AND COUPLING MECHANISM THEREFOR

FIELD OF THE INVENTION

The present invention relates to a cutting tool for metal cutting operations having two members releasably coupled together.

BACKGROUND OF THE INVENTION

Such cutting tools are assembled by inserting a male coupling member within a female coupling member and coaxially coupling them together.

U.S. Pat. No. 5,971,673 discloses a tool including a tool body and a cutting portion detachably mounted on the tool body. The tool body includes flutes formed in its outer surface, and a pair of forward projections at a front end of the tool body. The cutting portion includes front flutes, and a pair of recesses extending circumferentially in communication with respective ones of the front flutes. To connect the cutting portion to the tool body, the cutting portion and tool body are brought together so that the projections enter the front flutes. The cutting portion and tool body are coaxially coupled together in a self clamping fashion by rotating them relative to each other until the front flutes are aligned with the rear flutes and the projections enter the recesses to form therewith a bayonet coupling. The projections bend elastically in a radial direction during the relative rotation between the cutting portion and tool body. Repeated connecting/disconnecting of the cutting portion to/from the tool body reduces the elasticity of the projections thereby weakening the elasticity of the projections until eventually the cutting portion and tool body can no longer be coupled together in a self clamping fashion.

It is an objective of the present invention to provide a cutting tool of the type having a cutting portion and tool body that are coaxially coupled together in a self clamping fashion that significantly reduces or overcomes the aforementioned disadvantages.

SUMMARY OF THE INVENTION

In accordance with the present invention there is provided a cutting tool having a longitudinal axis defining forward and rearward directions, the cutting tool comprising:

a cutting head comprising a cutting portion and a head clamping portion extending in a rearward direction from the cutting portion;

a shank comprising a mounting portion for securing in a tool holder and a tool clamping portion extending in a forward direction from a forward end of the shank;

the head clamping portion comprising a male or female coupling member and the tool clamping portion comprising a corresponding female or male coupling member;

the male coupling member comprising a circumferentially continuous peripheral surface having at least two longitudinally extending support surfaces with surface recesses extending between the support surfaces, wherein the support surfaces lie on the surface of a common first cylindrical surface having a first diameter D1;

the female coupling member comprising a receiving bore having a circumferentially continuous bore wall comprising at least two longitudinally extending support walls with wall recesses extending between the support walls, wherein the support walls lie on the surface of a common third cylindrical surface having a third diameter D3, wherein D3<D1;

the male coupling member being insertable in the female coupling member into a releasing position in which the support surfaces are located opposite the wall recesses, and being rotatable therefrom about the longitudinal axis into a locking position in which the support surfaces abut the support walls, providing thereby self-clamping of the male and female coupling members.

In accordance with some embodiments, the peripheral surface of the male coupling member comprises piloting members located at extremities of the male coupling member with the support surfaces and surface recesses being located between the piloting members; wherein the piloting members are cylindrical in shape lying on a common second cylindrical surface having a second diameter D2, wherein D2<D3<D1.

If desired, the male coupling member comprises a male torque transmission member and the female coupling member comprises a female torque transmission member.

In accordance with some embodiments, the male torque transmission member comprises a projecting member projecting from one of the piloting members and the female torque transmission member comprises a torque transmission recess for receiving and engaging the male torque transmission member.

By one embodiment, the male torque transmission member is an integral part of the male coupling member.

By another embodiment, the male torque transmission member is a non-integral part of the male coupling member and secured thereto by means of a screw.

If desired the support walls merge with adjacent wall recesses via a transition wall formed as a segment of a cylinder.

Further if desired, the support surfaces merge with adjacent surface recesses via a transition surface formed as a segment of a cylinder.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 1:
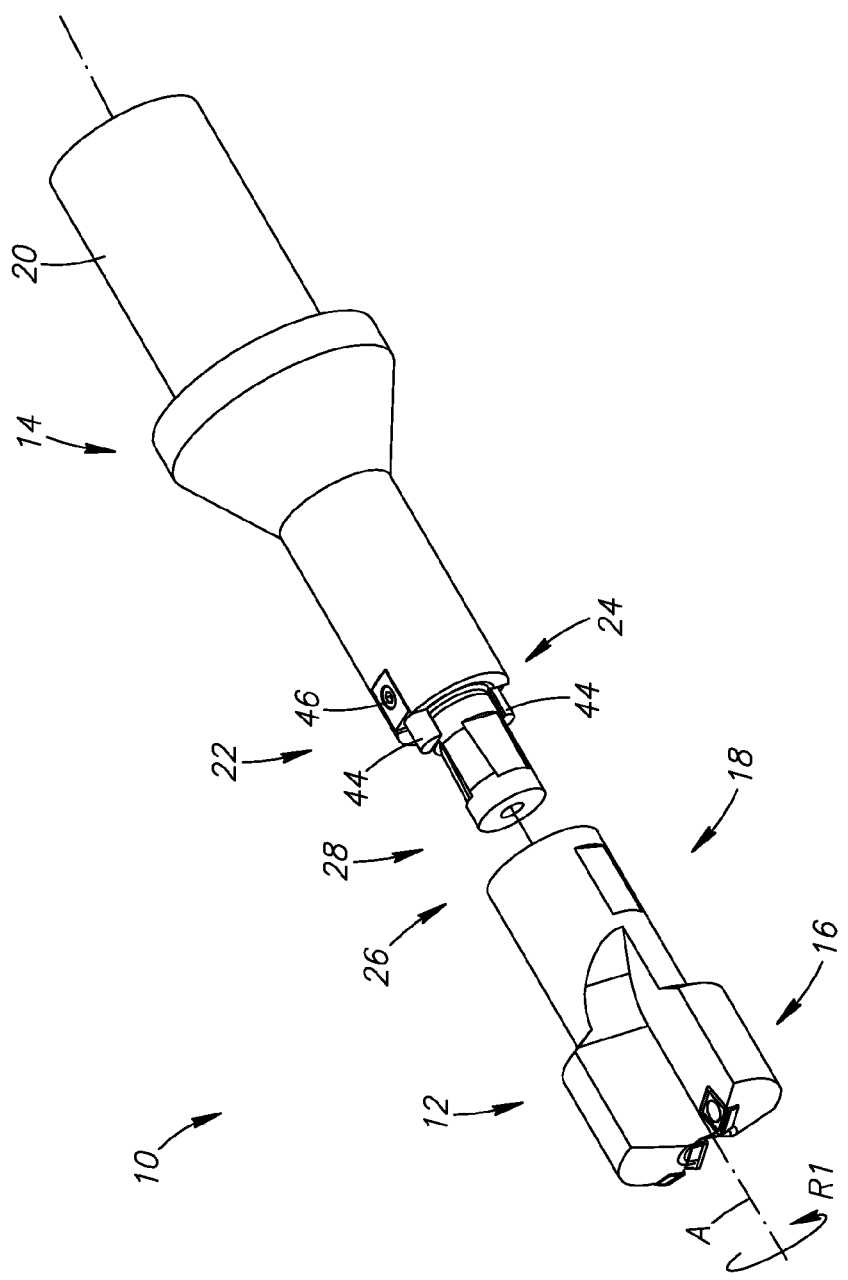
FIG. 1 is an exploded view of a cutting tool in accordance with the present invention.

Reference is made to FIG. 1, showing an exploded view of a cutting tool 10 in accordance with some embodiments of the present invention. The cutting tool 10 has a longitudinal axis A defining a longitudinal direction and forward and rearward directions in the longitudinal direction, and includes a cutting head 12 and a shank 14. During a cutting operation, the cutting tool 10 rotates about the longitudinal axis A in a cutting direction of rotation R1. The cutting head 12 includes a cutting portion 16 and a head clamping portion 18 extending in a rearward direction from the cutting portion 16. The shank 14 includes a mounting portion 20 at a rear end thereof for securing in a tool holder and a tool clamping portion 22 extending in a forward direction from a forward end 24 of the shank 14. In accordance with some embodiments of the present invention, the head clamping portion 18 includes a female coupling member 26 and the tool clamping portion 22 includes a corresponding male coupling member 28.

Figure 2:
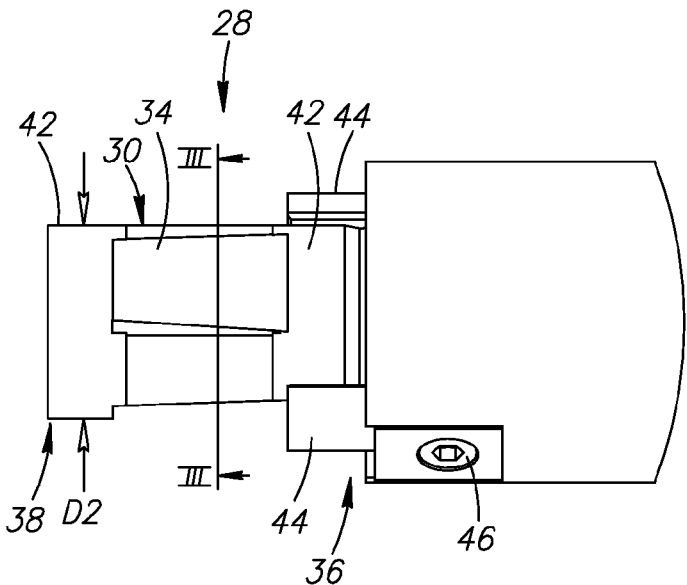
FIG. 2 is a partial side view of a shank showing a male coupling member 28 in accordance with the present invention.
Figure 3:
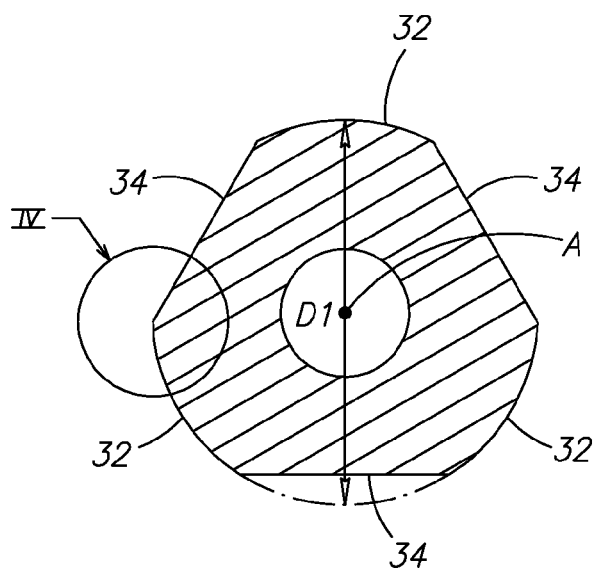
FIG. 3 is a cross section taken along the line III-III in FIG. 2.
Figure 4:
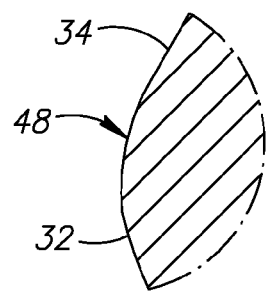
FIG. 4 is a detail of FIG. 3.
Figure 5:
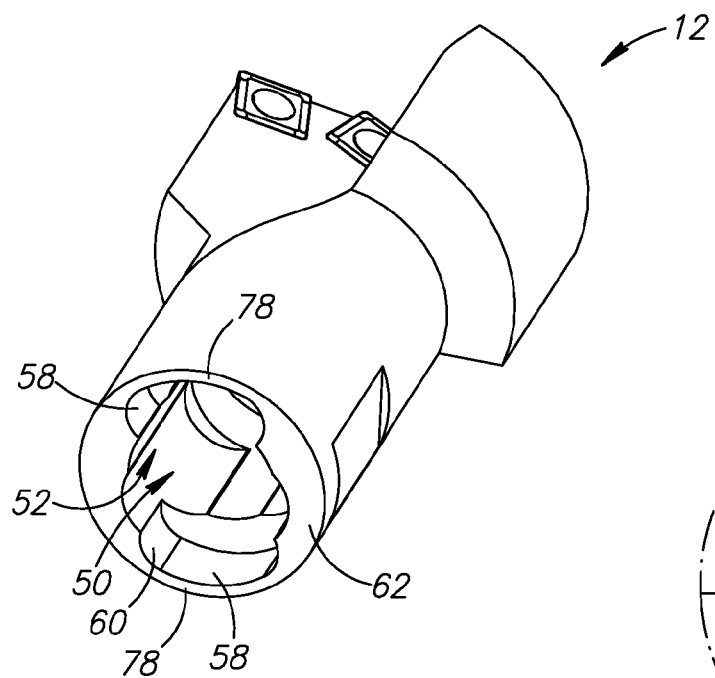
FIG. 5 is a perspective view of a cutting head showing a female coupling member 26 in accordance with the present invention.
Figure 6:
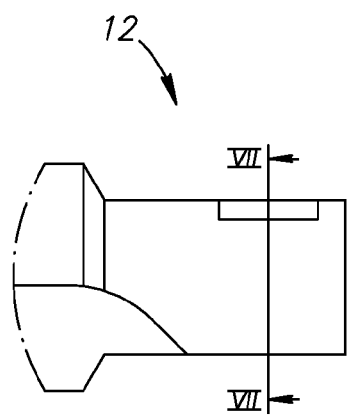
FIG. 6 is a partial side view of the cutting head shown in FIG. 5.
Figure 7:
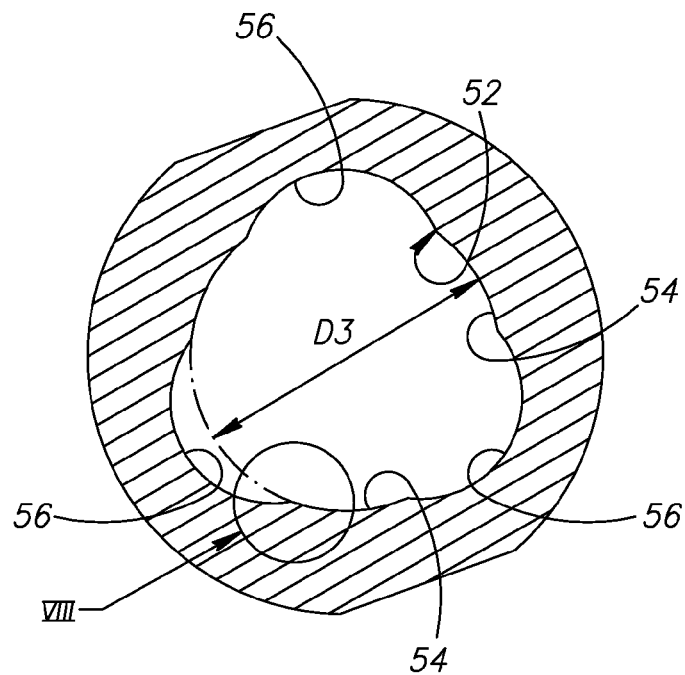
FIG. 7 is a cross section taken along the line VII-VII in FIG. 6.

Attention is now drawn in addition to FIGS. 2 to 4, showing the male coupling member 28 in accordance with embodiments of the present invention. The male coupling member 28 has a circumferentially continuous peripheral surface 30 having three longitudinally extending support surfaces 32. A surface recess 34 extends between each pair of support surfaces 32. In any cross section taken through the support surfaces 32 and surface recesses 34 perpendicular to the axis A, the support surfaces 32 are radially further from the axis A than the surface recesses 34. The support surfaces 32 lie on the surface of a common first cylindrical surface having a first diameter D1.

The male coupling member 28 has two extremities in the longitudinal direction, a rear extremity 36 and a forward extremity 38. The rear extremity 36 projects forwardly from a forwardly facing forward face 40 of the shank 14 and the forward extremity 38 of the male coupling member 28 is located at a free end of the male coupling member 28. At each extremity there is a piloting member 42. The support surfaces 32 and surface recesses 34 are located between the piloting members 42. The piloting members 42 are cylindrical in shape and lie on a common second cylindrical surface having a second diameter D2. The second diameter D2 is less than the first diameter D1.

The male coupling member 28 has two male torque transmission members 44. The male torque transmission members 44 may be projecting members projecting from the piloting member 42 located at the rear extremity 36 of the male coupling member 28. The male torque transmission members 44 may project from the forward face 40 of the shank 14. The male torque transmission members 44 may be removable members and may be secured by means of a screw 46 to the male coupling member 28. In accordance with some embodiments, the male torque transmission member 44 may be an integral part of the male coupling member 28.

In order to create a smooth transition between a support surface 32 and an adjacent surface recess 34, the support surfaces 32 may merge with adjacent surface recesses 34 via a transition surface 48 as shown in FIG. 4. The transition surface 48 may be formed, for example, as a segment of a cylinder.

Attention is now drawn to FIGS. 5 to 8, showing the female coupling member 26 in accordance with embodiments of the present invention. The female coupling member 26 has a receiving bore 50 having a continuous bore wall 52. The bore wall 52 has three longitudinally extending support walls 54. A wall recess 56 extends between each pair of support walls 54. In any cross section taken through the support walls 54 and wall recesses 56 perpendicular to the axis A, the support walls 54 are radially closer to the axis A than the wall recesses 56. The support walls 54 lie on the surface of a common third cylindrical surface having a third diameter D3. The third diameter D3 is less than the first diameter D1. In addition, the third diameter D3 is greater than the second diameter D2. Hence, the following relationship holds: D2<D3<D1. The female coupling member 26 has two female torque transmission members 58. The female torque transmission members 58 may be a pair of circumferentially spaced apart torque transmission recesses for receiving and engaging the male torque transmission members 44 at stop surfaces 60 for preventing relative rotation of the female and male clamping members 26, 28 with respect to each other. The female torque transmission members 58 are located adjacent a rearwardly facing rear face 62 of the cutting head 12. The rear face 62 of the cutting head 12 may thus have a non-circular opening 80 formed therein which communicates with the receiving bore 50. The non-circular opening 80 may comprise a central area connected to the circumferentially spaced apart female torque transmission members 58 on opposite sides of the central area. Due to their shape and position, the female torque transmission members 58 are located adjacent a thinned web portion 78 of the rearwardly facing rear face 62.

Figure 8:
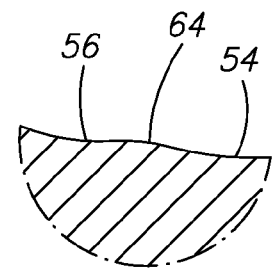
FIG. 8 is a detail of FIG. 7.
Figure 9:
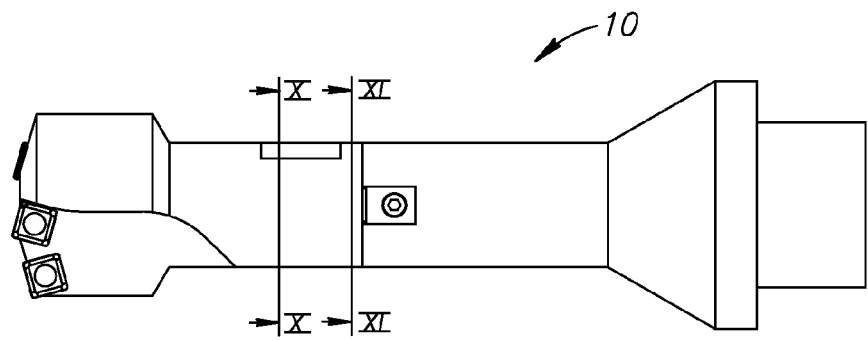
FIG. 9 is a side view of the cutting tool shown in FIG. 1.

In order to create a smooth transition between a support wall 54 and an adjacent wall recess 56, the support walls 54 may merge with adjacent wall recesses 56 via a transition wall 64 as shown in FIG. 8. The transition wall 64 may be formed, for example, as a segment of a cylinder.

Figure 10:
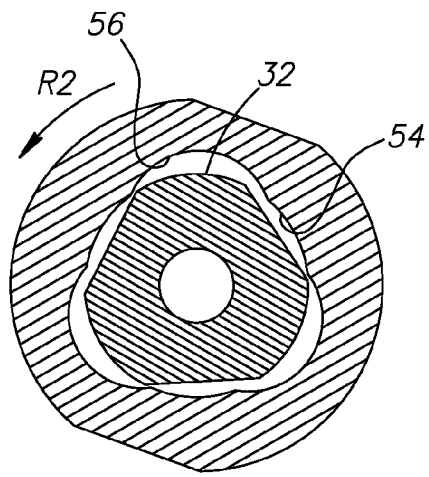
FIG. 10 is a cross sectional view taken along the line X-X in FIG. 9 with the cutting tool in a releasing position.
Figure 11:
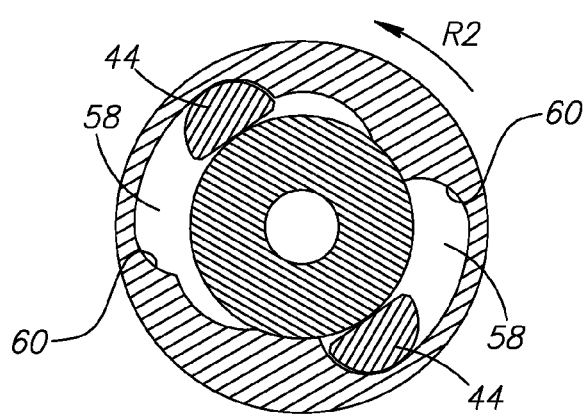
FIG. 11 is a cross sectional view taken along the line XI-XI in FIG. 9 with the cutting tool in a releasing position.

Attention is now drawn to FIGS. 9 to 13, illustrating the assembly of the cutting tool 10. The cutting tool 10 is assembled by first inserting the male coupling member 28 into the female coupling member 26 in a releasing position as shown in FIG. 10. In the releasing position the support surfaces 32 are located opposite the wall recesses 56 and the male torque transmission members 44 are located in the female torque transmission members 58 but do not engage the stop surfaces 60, as shown in FIG. 11. The support surfaces 32 and wall recesses 56 are dimensioned so as to ensure that they do not engage each other in the releasing position.

Figure 12:
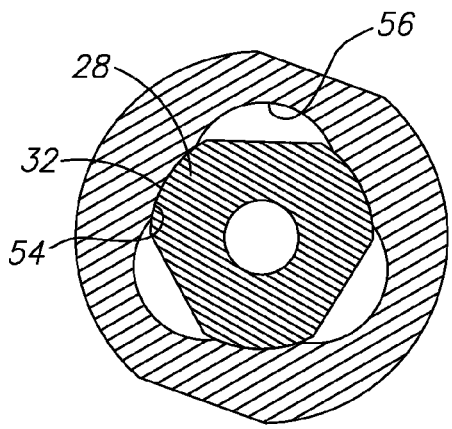
FIG. 12 is a cross sectional view taken along the line X-X in FIG. 12 with the cutting tool in a locking position.
Figure 13:
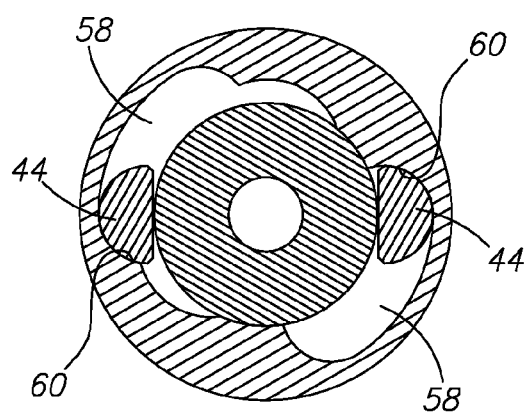
FIG. 13 is a cross sectional view taken along the line XI-XI in FIG. 12 with the cutting tool in a locking position.

The male coupling member 28 is rotated from the releasing position to a locking position by rotating it in a locking direction of rotation R2 about the longitudinal axis A relative to the female coupling member 26. In the locking position the support surfaces 32 abut the support walls 54, as shown in FIG. 12, to provide self-clamping of the female and male coupling members 26, 28. Self-clamping is provided by friction between the support surfaces 32 and the support walls 54, which is generated due to the fact that D3 is less than D1. In the locking position the male torque transmission members 44 engage the stop surfaces 60 of the female torque transmission members 58 as shown in FIG. 13, whereby further relative rotation of the female and male coupling members 26, 28 is prevented. The locking direction of rotation R2 of the male coupling member 28 is the same direction as the cutting direction of rotation R1 of the cutting tool 10 during a cutting operation. Therefore, rotation of the cutting tool 10 during a cutting operation maintains the locking forces. Disassembly of the cutting tool 10 is carried out by rotating the male coupling member 28 in a direction opposite that of the locking direction of rotation R2 relative to the female coupling member 26 from the locking position to the releasing position.

From FIG. 10 it is clear that in the releasing position there is no contact between the support surfaces 32 and the support walls 54. Therefore, in the releasing position, the piloting members 42 aid in aligning the female and male coupling members 26, 28, keeping them coaxial. The piloting member 42 at the forward extremity 38 of the male coupling member 28 also aids in guiding the male coupling member 28 into the female coupling member 26 during assembly of the cutting tool 10.

The female coupling member 26 has a certain degree of elasticity. This is required since D3 is less than D1 and in order to accommodate the male coupling member 28 in the receiving bore 50 in the locking position the female coupling member 26 has to be expandable. Having the support walls 54 of the female coupling member 26 located on a circumferentially continuous bore wall 52 is advantageous over those clamping mechanisms which have support walls located on a non-continuous wall. The circumferentially continuous bore wall 52 provides greater strength than a non-continuous wall due the closed structure and also increases the effective life time of the female coupling member 26. Support walls located on a non-continuous wall tend to lose their elasticity (and consequently their clamping ability) more quickly. That is, female coupling members having support walls located on a non-continuous wall can be used a smaller number of times for assembling and disassembling a cutting tool in comparison with the female coupling members 26 in accordance with the present invention.

It is also noted that, in this invention, even though the diameter D3 defined by the support walls 54 of female clamping member 26 is less than the diameter D1 defined by the support surfaces 32 of the male clamping member 28, insertion of the male clamping member 28 into the female clamping member 26 can be accomplished without the application of heat to expand the female clamping member 26, such as in "shrink-fit"-type couplings.

Although the present invention has been described to a certain degree of particularity, it should be understood that various alterations and modifications could be made without departing from the scope of the invention as hereinafter claimed.

What is claimed is:

1. A cutting tool (10) having a longitudinal axis (A) defining forward and rearward directions, the cutting tool (10) comprising:
a cutting head (12) comprising a cutting portion (16) and a head clamping portion (18) extending in a rearward direction from the cutting portion (16);
a shank (14) comprising a mounting portion for securing in a tool holder and a tool clamping portion (22) extending in a forward direction from a forward end of the shank (14);
the head clamping portion (18) comprising a male or female coupling member (28, 26) and the tool clamping portion (22) comprising a corresponding female or male coupling member (26, 28);
the male coupling member (28) comprising a circumferentially continuous peripheral surface (30) having at least two longitudinally extending support surfaces (32) with surface recesses (34) extending between the support surfaces (32), wherein the support surfaces (32) lie on the surface of a common first cylindrical surface having a first diameter D1;
the female coupling member (26) comprising a receiving bore (50) having a circumferentially continuous bore wall (52) comprising at least two longitudinally extending support walls (54) with wall recesses (56) extending between the support walls (54), wherein the support walls (54) lie on the surface of a common third cylindrical surface having a third diameter D3, wherein D3<D1;
the male coupling member (28) being insertable into the female coupling member (26) into a releasing position in which the support surfaces (32) are located opposite the wall recesses (56), and being rotatable therefrom about the longitudinal axis (A) into a locking position in which the support surfaces (32) abut the support walls (54), providing thereby self-clamping of the male and female coupling members (26).

2. The cutting tool (10) according to claim 1, wherein the peripheral surface (30) of the male coupling member (28) comprises piloting members located at extremities of the male coupling member (28) with the support surfaces (32) and surface recesses (34) being located between the piloting members; wherein the piloting members are cylindrical in shape lying on a common second cylindrical surface having a second diameter D2, wherein D2<D3<D1.

3. The cutting tool (10) according to claim 1, wherein the male coupling member (28) comprises a male torque transmission member (44) and the female coupling member (26) comprises a female torque transmission member (58).

4. The cutting tool (10) according to claim 3, wherein the male torque transmission member (44) comprises a projecting member projecting from one of the piloting members (42) and the female torque transmission member (58) comprises a torque transmission recess for receiving and engaging the male torque transmission member (44).

5. The cutting tool (10) according to claim 4, wherein the male torque transmission member (44) is an integral part of the male coupling member (28).

6. The cutting tool (10) according to claim 4, wherein the male torque transmission member (44) is a non-integral part of the male coupling member (28) and secured thereto by means of a screw (46).

7. The cutting tool (10) according to claim 1, wherein the support walls (54) merge with adjacent wall recesses (56) via a transition wall (64) formed as a segment of a cylinder.

8. The cutting tool (10) according to claim 1, wherein the support surfaces (32) merge with adjacent surface recesses (34) via a transition surface (48) formed as a segment of a cylinder.

9. The cutting tool (10) according to claim 1, wherein the male coupling member (28) is insertable into the female coupling member (26) without application of heat to expand a bore of the female coupling member (26).

10. A cutting tool coupling mechanism for a cutting tool having a longitudinal axis (A) defining forward and rearward directions, the cutting tool coupling mechanism comprising:
a head clamping portion (18) comprising a male or female coupling member (28, 26);
a tool clamping portion (22) comprising a corresponding female or male coupling member (26, 28);
the male coupling member (28) comprising a circumferentially continuous peripheral surface (30) having at least two longitudinally extending support surfaces (32) with surface recesses (34) extending between the support surfaces (32), wherein the support surfaces (32) lie on the surface of a common first cylindrical surface having a first diameter D1;
the female coupling member (26) comprising a receiving bore (50) having a circumferentially continuous bore wall (52) comprising at least two longitudinally extending support walls (54) with wall recesses (56) extending between the support walls (54), wherein the support walls (54) lie on the surface of a common third cylindrical surface having a third diameter D3, wherein D3<D1;
the male coupling member (28) being insertable into the female coupling member (26) into a releasing position in which the support surfaces (32) are located opposite the wall recesses (56), and being rotatable therefrom about the longitudinal axis (A) into a locking position in which the support surfaces (32) abut the support walls (54), providing thereby self-clamping of the male and female coupling members (26).

11. The cutting tool coupling mechanism according to claim 10, wherein the peripheral surface (30) of the male coupling member (28) comprises piloting members located at extremities of the male coupling member (28) with the support surfaces (32) and surface recesses (34) being located between the piloting members; wherein the piloting members are cylindrical in shape lying on a common second cylindrical surface having a second diameter D2, wherein D2<D3<D1.

12. The cutting tool coupling mechanism according to claim 10, wherein the male coupling member (28) comprises a male torque transmission member (44) and the female coupling member (26) comprises a female torque transmission member (58).

13. The cutting tool coupling mechanism according to claim 12, wherein the male torque transmission member (44) comprises a projecting member projecting from one of the piloting members (42) and the female torque transmission member (58) comprises a torque transmission recess for receiving and engaging the male torque transmission member (44).

14. The cutting tool coupling mechanism according to claim 13, wherein the male torque transmission member (44) is an integral part of the male coupling member (28).

15. The cutting tool coupling mechanism according to claim 13, wherein the male torque transmission member (44) is a non-integral part of the male coupling member (28) and secured thereto by means of a screw (46).

16. The cutting tool coupling mechanism according to claim 10, wherein the support walls (54) merge with adjacent wall recesses (56) via a transition wall (64) formed as a segment of a cylinder.

17. The cutting tool coupling mechanism according to claim 10, wherein the support surfaces (32) merge with adjacent surface recesses (34) via a transition surface (48) formed as a segment of a cylinder.

18. The cutting tool coupling mechanism according to claim 10, wherein the male coupling member (28) is insertable into the female coupling member (26) without application of heat to expand a bore of the female coupling member (26).

19. A cutting head (12) having a cutting portion (16) and a head clamping portion (18) extending in a rearward direction from the cutting portion (16), the head clamping portion (18) comprising exactly one of:
(a) a male coupling member (28) comprising:
a circumferentially continuous peripheral surface (30) having at least two longitudinally extending support surfaces (32) with surface recesses (34) extending between the support surfaces (32); and
at least one male torque transmission member (44);
wherein the support surfaces (32) merge with adjacent surface recesses (34) via a transition surface (48);
wherein the support surfaces (32) lie on the surface of a common first cylindrical surface having a first diameter D1;
wherein the peripheral surface (30) comprises piloting members (42) located at extremities of the male coupling member (28) with the support surfaces (32) and surface recesses (34) being located between the piloting members (42); and
wherein the piloting members (42) are cylindrical in shape lying on a common second cylindrical surface having a second diameter D2, wherein D2<D1; and
(b) a female coupling member (26) comprising:
a rearwardly facing rear face (62) having a non-circular opening (78) formed therein;
a receiving bore (50) communicating with the non-circular opening (78), the receiving bore (50) having a circumferentially continuous bore wall (52) comprising at least two longitudinally extending support walls (54) with wall recesses (56) extending between the support walls (54); and
at least one circumferentially extending female torque transmission member (58) connected to the non-circular opening (78) and located adjacent a thinned web portion (78) of the rearwardly facing rear face (62);
wherein the support walls (54) merge with adjacent wall recesses (56) via a transition wall (64); and
wherein the support walls (54) lie on the surface of a common third cylindrical surface having a third diameter D3.

20. A tool shank (14) having a tool clamping portion (22) extending in a forward direction from a forward end of the shank (14), the tool clamping portion (22) comprising exactly one of:
(a) a male coupling member (28) comprising:
a circumferentially continuous peripheral surface (30) having at least two longitudinally extending support surfaces (32) with surface recesses (34) extending between the support surfaces (32); and
at least one male torque transmission member (44);
wherein the support surfaces (32) merge with adjacent surface recesses (34) via a transition surface (48);
wherein the support surfaces (32) lie on the surface of a common first cylindrical surface having a first diameter D1;
wherein the peripheral surface (30) comprises piloting members (42) located at extremities of the male coupling member (28) with the support surfaces (32) and surface recesses (34) being located between the piloting members (42); and
wherein the piloting members (42) are cylindrical in shape lying on a common second cylindrical surface having a second diameter D2, wherein D2<D1; and
(b) a female coupling member (26) comprising:
a rearwardly facing rear face (62) having a non-circular opening (78) formed therein;
a receiving bore (50) communicating with the non-circular opening (78), the receiving bore (50) having a circumferentially continuous bore wall (52) comprising at least two longitudinally extending support walls (54) with wall recesses (56) extending between the support walls (54); and
at least one circumferentially extending female torque transmission member (58) connected to the non-circular opening (78) and located adjacent a thinned web portion (78) of the rearwardly facing rear face (62);
wherein the support walls (54) merge with adjacent wall recesses (56) via a transition wall (64); and
wherein the support walls (54) lie on the surface of a common third cylindrical surface having a third diameter D3.

* * * * *